United States Patent
Lee

(10) Patent No.: US 9,723,263 B2
(45) Date of Patent: Aug. 1, 2017

(54) AUDIO PROCESSING OF SHARED CONTENT

(71) Applicant: Hewlett-Packard Development Company, L.P., Houston, TX (US)

(72) Inventor: Bowon Lee, Palo Alto, CA (US)

(73) Assignee: Hewlett-Packard Development Company, Houston, TX (US)

( * ) Notice: Subject to any disclaimer, the term of this patent is extended or adjusted under 35 U.S.C. 154(b) by 334 days.

(21) Appl. No.: 13/874,196

(22) Filed: Apr. 30, 2013

(65) Prior Publication Data
US 2014/0320589 A1    Oct. 30, 2014

(51) Int. Cl.
*H04N 7/15*    (2006.01)
*H04M 9/08*    (2006.01)

(52) U.S. Cl.
CPC .............. *H04N 7/15* (2013.01); *H04M 9/082* (2013.01)

(58) Field of Classification Search
CPC ............................... H04M 9/082; H04M 7/006
USPC ........................................ 379/406.06, 406.13
See application file for complete search history.

(56) References Cited

U.S. PATENT DOCUMENTS

| 8,150,052 | B2 | 4/2012 | Gygax et al. | |
|---|---|---|---|---|
| 8,391,472 | B2* | 3/2013 | Ghani et al. | 379/406.13 |
| 8,873,741 | B2* | 10/2014 | Ballagas | H04M 9/082 370/268 |
| 2008/0304653 | A1 | 12/2008 | Ghani et al. | |
| 2013/0002797 | A1 | 1/2013 | Thapa et al. | |
| 2013/0003962 | A1* | 1/2013 | Ballagas | H04M 9/082 379/406.06 |
| 2015/0304375 | A1* | 10/2015 | Dhillon | H04L 65/4007 370/259 |

OTHER PUBLICATIONS

Gazziro, M. et al.,Multi-modal Acoustic Echo Canceller for Video Conferencing Systems,http://www.decom.ufop.br/sibgrapi2012/eproceedings/technical/ts10/101370_3.pdf> On pp. 302-307,2012.

* cited by examiner

*Primary Examiner* — Amal Zenati
(74) *Attorney, Agent, or Firm* — HP Patent Department

(57) ABSTRACT

An audio processor for a video conference system receives an audio signal from content to be shared over a video conference and an audio signal from a network. The audio signal from the shared content and the audio signal from the network are mixed together for output to a speaker. The audio processor may also receive a local audio signal from a microphone. The local audio signal is mixed with the audio signal of the shared to content to generate an outbound signal.

13 Claims, 3 Drawing Sheets

AUDIO PROCESSING OF SHARED CONTENT

BACKGROUND

Video conferencing implements telecommunication technologies to allow two or more locations to communicate by simultaneous two-way video and audio transmissions. With the introduction of relatively low cost, high capacity broadband telecommunication services, coupled with powerful computing processors and video compression techniques, video conferencing has become a popular method of communication between people at different locations. In addition to the audio and video transmission of meeting activities, video conferencing technologies may be used to share documents and other types of content that may include both audio and video streams.

BRIEF DESCRIPTION OF THE DRAWINGS

The following detailed description references the drawings, wherein.

DETAILED DESCRIPTION

During video conferencing, a participant at one location may play a video clip to share with other video conference participants. The video may be composited with a video stream covering a view of a room where the participant is located such that the video conference participants at other end points may view the video. The audio from the video clip may also need to be output at the other end points including the location of the person sharing the video. A microphone that captures the voice of the person who shares the video may be used to share audio from the video clip. However, sound quality may suffer due to non-ideal acoustic coupling between the video playback device and the microphone that is originally designed to capture a user's voice rather than audio from a playback device. In addition, a double talk situation may be created which may be detrimental to acoustic echo cancellation algorithms.

The audio signal from the video clip may be mixed into the outbound audio stream while playing the same audio in the local room where the user is sharing the video clip. In this case, the end points of the video conference will hear two copies of the audio, one audio signal that is directly sent to the end points and another audio signal that is captured at the microphone in the room where the user is sharing the video clip. The person sharing the video clip can mute the audio playback at his location to prevent transmission of the audio signal copies. However, in this case, the person sharing the video will not able to hear any audio from the video. The person sharing the video may mute the microphone and send only audio from the shared video. However, if this is done, any speech from the location that shares the video cannot be heard at the other endpoints of the video conference. Any conversation between location that is sharing the video and the other locations would only be audible by unmuting the microphone.

Example embodiments disclosed herein address these issues by providing audio processing of shared content to maintain voice communication while sharing content and to promote hands-free video conferencing systems.

Figure 1:
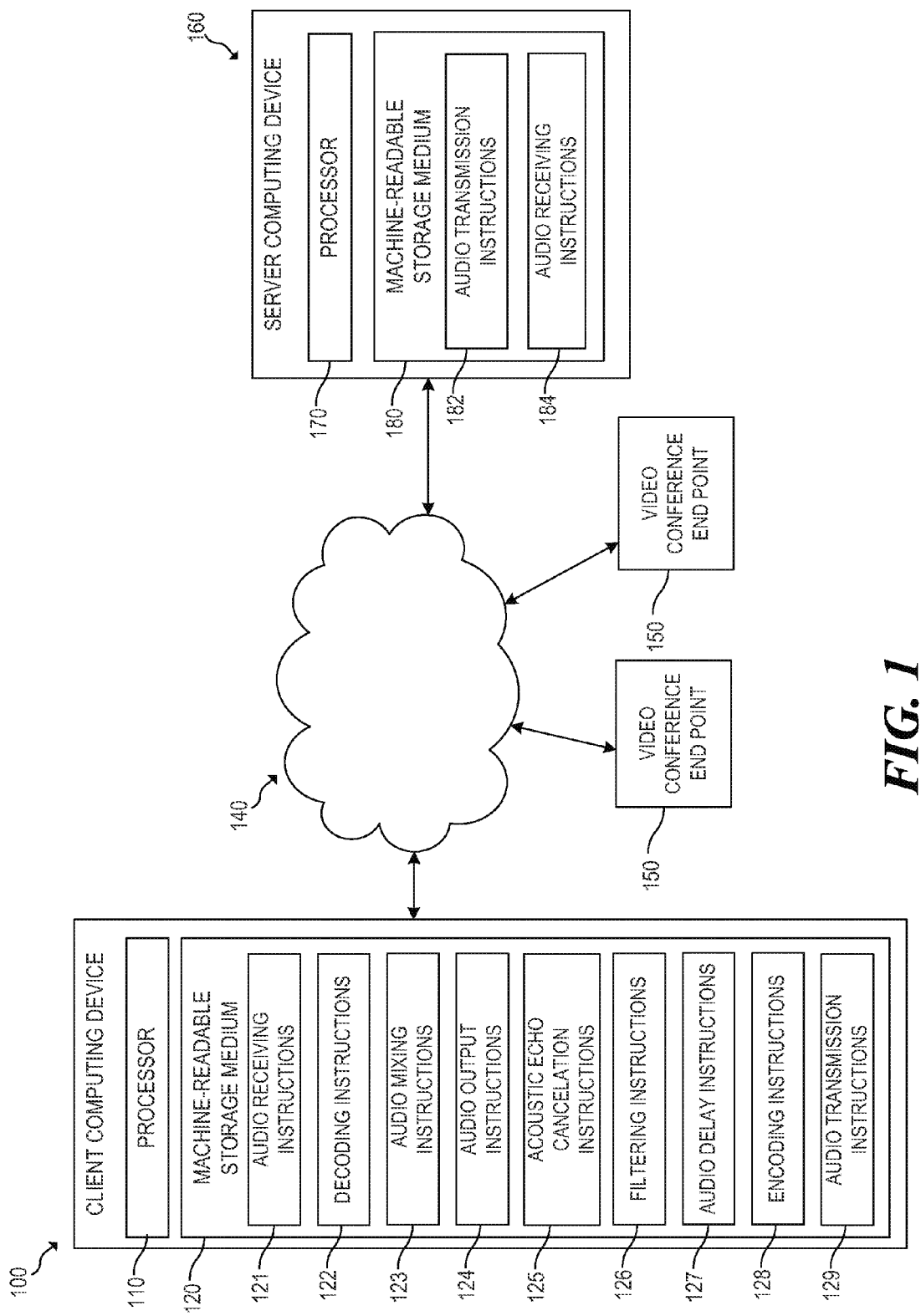
FIG. 1 is a block diagram of an example server computing device in communication via a network with an example client computing device for processing audio of shared content.

Referring now to the drawings, FIG. 1 is a block diagram of an example server computing device 160 in communication via a network 140 with a client computing device 100 and video conference endpoints 150.

Client computing device 100 may be any computing device accessible to a server device, such as server computing device 160, over network 140. Example networks include the Internet, a local area network (LAN), and a wide area network (WAN). In the embodiment of FIG. 1, client computing device 100 includes a processor 110 and a machine-readable storage medium 120.

Processor 110 may be one or more central processing units (CPUs), microprocessors, and/or other hardware devices suitable for retrieval and execution of instructions 121, 122, 123, 124, 125, 126, 127, 128, 129 stored in machine-readable storage medium 120. Processor 110 may fetch, decode, and execute instructions 121-129 to process audio of shared content, as described below. As an alternative or in addition to retrieving and executing instructions, processor 110 may include one or more electronic circuits comprising a number of electronic components for performing the functionality of one or more of instructions 121-129.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions 121-129 for processing audio of shared content.

Server computing device 160 may be, for example, a notebook computer, a desktop computer, an all-in-one system, a thin client, a workstation, a tablet computing device, a mobile phone, or any other computing device suitable for execution of the functionality described below. In FIG. 1, server computing device 160 includes processor 170 and machine-readable storage medium 180.

As with processor 110 of client computing device 100, processor 170 may be one or more CPUs, microprocessors, and/or other hardware devices suitable for retrieval and execution of instructions 182, 184. Processor 170 may fetch, decode, and execute instructions 182, 184 to receive and transmit audio. Processor 110 may also or instead include electronic circuitry for performing the functionality of one or more instructions 182, 184. As with storage medium 120 of client computing device 100, machine-readable storage medium 180 may be any physical storage device that stores executable instructions.

Communication may be established between client computing device 100 and server computing device 160. For example, client computing device 100 may access server computing device 160 at a predetermined Uniform Resource Locator (URL) and, in response, server computing device 160 may establish a communication session with client computing device 100. In some implementations, client login credentials, such as a user identifier and a corresponding authentication parameter (e.g., a password), may be used to establish communication with server computing device 160.

Video conference end points 150 may also communicate with client computing device 100 and server computing device 160 via network 140. Video conference end points 150 may each correspond to different locations where other users may participate in a video conference with a user at client computing device 100. Each video conference end point 150 may be a client computing device, such as client computing device 100, to capture, process, mix and render various audio and video signals.

Audio transmission instructions 182 may transmit an audio signal received from video conference endpoint 150 to client computing device 100 via network 140. In some implementations, the audio signal may be received at server computing device 160 from video conference endpoint 150. In other implementations, video conference endpoint 150 may cause the audio signal to be sent directly to client computing device 100 via network 140 without being transmitted to server computing device 160. The audio signal may be: 1) a single audio signal that is down mixed at server computing device 160 from audio signals transmitted from video conference end points 150 (commonly referred to as multicast); 2) multiple audio signals transmitted directly from multiple video conference end points 150 (commonly referred to as unicast of peer-to-peer), or 3) a combination of both. The audio signal may correspond to speech of the participants or any other types of sound produced at video conference endpoint 150.

Audio receiving instructions 121 may receive the audio signal from network 140. Audio receiving instructions 121 may also receive another audio signal from shared content. The shared content may be a video clip or any other type of audio producing means that is being played where client computing device 100 is located. For example, the shared content may be a video clip downloaded from the Internet that the user wants to share with the other participants at video conference endpoints 150. Audio receiving instructions 121 may also receive an audio signal from a microphone coupled to client computing device 100.

Decoding instructions 122 may decode the audio signal received at client computing device 100 from server computing device 160 or video conference endpoints 150 via network 140.

Audio mixing instructions 123 may be used to control a mixer for mixing the decoded audio signal received from server computing device 160 or video conference endpoints 150 together with the audio signal from the shared content.

Audio output instructions 124 may output the audio signal from the mixer to a speaker coupled to client computing device 100 for local playback.

Acoustic echo cancellation instructions 125 may cancel any echoes caused by the audio signal that is output to the speaker from the audio signal that is received at the microphone. The echoes may be generated from the audio signal of the shared content and from the inbound audio signal received via network 140. The acoustic echo cancellation may also prevent the inbound audio signal received from network 140 from being sent back to server computing device 160 or video conference end points 150 via network 140.

Filtering instructions 126 may be used to filter noise and other undesired features from the audio signal output from the acoustic echo cancellation. Filtering instructions 126 may also include audio signal enhancement such as automatic gain control (AGC).

Audio delay instructions 127 may delay the audio signal from the shared content. Since the acoustic echo cancellation may not sufficiently cancel the echo from the audio signal of the shared content, a delay that corresponds to the delay caused by the acoustic echo of the audio signal of the shared content may be applied to the audio signal of the shared content before mixing to an outbound audio signal. Accordingly, any residual echo at an output of the acoustic echo cancellation may be masked by the same audio signal of the shared content.

Audio mixing instructions 123 may also mix the delayed audio signal from the shared content with the filtered audio signal from the microphone. By mixing the delayed audio signal from the shared content right before an encoding stage, quality degradation in an outbound audio signal may be avoided.

Encoding instructions 128 may encode the audio signal received from the mixer for transmission of an outbound audio signal over network 140.

Audio transmission instructions 129 may cause the encoded audio signal to be transmitted to server computing device 160 or video conference endpoints 150 over network 140.

Audio receiving instructions 184 may cause server computing device 160 to receive the encoded audio signal from client computing device 100 via network 140. In some implementations, audio receiving instructions 184 may also cause server computing device 160 to receive the encoded audio signal from video conference end points 150 via network 140.

Figure 2:
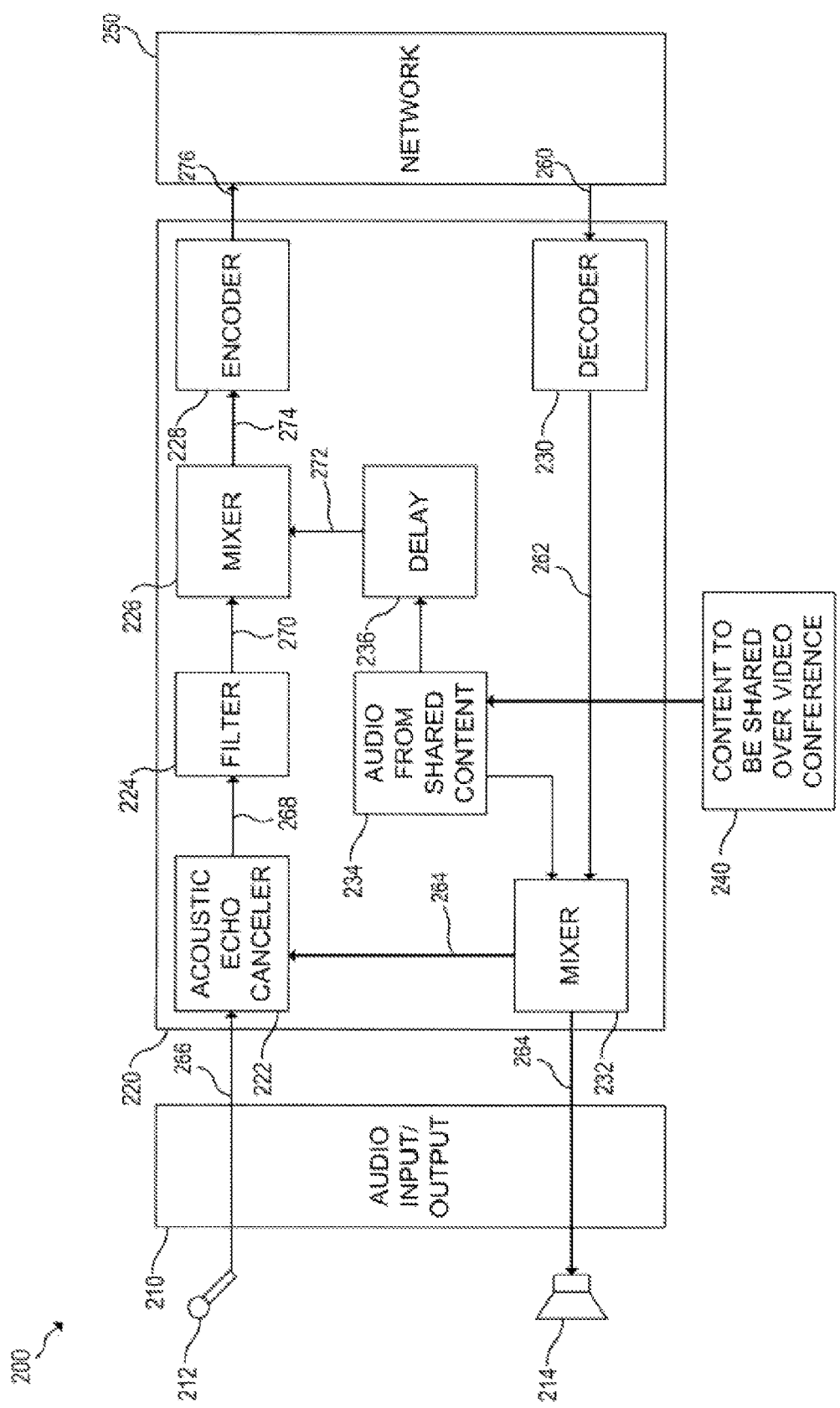
FIG. 2 is a block diagram of an example system for processing audio of shared content.

FIG. 2 is a block diagram of an example system 200 for processing audio of shared content. System 200 includes an audio input/output subsystem 210 coupled to an audio processor 220. Audio processor 220 is coupled to a network 250.

Audio input/output subsystem 210 may include a microphone 212 and a speaker 214. Audio processor 220 includes an acoustic echo canceler 222, a filter 224, a mixer 226, and an encoder 228. Audio processor 220 may also include a decoder 230, a mixer 232, audio from shared content 234, and a delay 236.

Audio from shared content 234 may be received as an input from content to be shared over a video conference 240. For example, audio from shared content 234 may correspond to an audio signal from a video clip to be shared with other participants in a video conference. The shared content may be any type of audio producing means to be shared over the video conference.

Decoder 230 receives as input an inbound audio signal 260 from network 250. The inbound audio signal 260 from network 250 may be transmitted from server computing device 160 or from video conference end points 150. Inbound audio signal 260 may be: 1) a single audio signal that is down mixed at server computing device 160 from audio signals transmitted from video conference end points 150; 2) multiple audio signals transmitted directly from multiple video conference end points 150, or 3) a combination of both.

Mixer 232 receives as input an output from decoder 230 and audio from shared content 234. In the event that multiple inbound audio signals are received, multiple decoders 230 may be provided in the audio processor 220. Mixer 232 provides an output to audio input/output subsystem 210 for local audio playback at speaker 214. Mixer 232 may also provide an output to acoustic echo canceler 222.

Acoustic echo canceler 222 receives as input an output from audio input/output subsystem 210 and mixer 232. Filter 224 receives an input from acoustic echo canceler 222 and provides an output to mixer 226. Delay 236 receives as input audio from shared content 234 and provides an output to mixer 226. Mixer 226 receives as input an output from filter 224 and an output from delay 236. Mixer 226 provides an output to encoder 228. Encoder 228 receives as input an output from mixer 226 and provides an output to network 250.

Decoder 230 receives audio signal 260 transmitted from video conference end point 150 via network 250. In some implementations, decoder 230 may receive multiple audio signals 260 transmitted from two or more video conference end points 150 via network 250. Audio signal 260 may be generated by participants in the video conference. Audio signal 260 may correspond to speech of the participants or any other types of sound produced at an end point of the video conference. Decoder 230 may decode audio signal 260 to produce audio signal 262.

Mixer 232 receives as input audio signal 262 from decoder 230 and audio from shared content 234. Mixer 232 mixes audio 262 and audio from shared content 234 to produce audio signal 264. Audio signal 264 is output from mixer 232 to audio input/output subsystem 210 where audio signal 264 is output to speaker 214 for local playback. Audio signal 264 is also output from mixer 232 to acoustic echo canceler 222.

Acoustic echo canceler 222 receives as input an audio signal 266 output from microphone 212 and audio signal 264 output from mixer 232. Audio signal 266 may correspond to sound that is generated in a room where a user is sharing the content in a video conference. Acoustic echo canceler 222 may cancel audio signal 264 from audio signal 266 that is received at microphone 266 to produce audio signal 268. Acoustic echo canceler 222 may cancel any echoes from audio signal 266 that may be generated from audio from the shared content 234 and from audio signal 260 received via network 250. Accordingly, audio signal 268 corresponds to audio signal 266 with any echoes removed therefrom.

Filter 224 receives as input audio signal 268 and may filter any noise or other undesired features therefrom. Filter 224 may also filter the audio signal 268 for further enhancement such as AGC. Filter 224 then outputs audio signal 270.

Delay 236 receives as input audio from shared content 234. Delay 236 may delay audio from the shared content 234 by an amount that corresponds to the delay caused by the acoustic echo of audio of the shared content 234 since acoustic echo canceler 222 may not cancel all echoes from audio of the shared content 234. Accordingly, any residual echo in audio signal 270 may be masked by delaying audio from the shared content 234. The amount of the delay may further reflect the combined processing delays at acoustic echo canceller 220, filter 224 and any other processing modules in the audio processor 220. Delay 236 outputs the delayed version of audio from shared content 234 (audio signal 272) to mixer 226.

Mixer 226 receives as input audio signal 270 from filter 224 and audio signal 272 from delay 236. By mixing audio signal 272 with audio signal 270 before an encoding stage, quality degradation in an outbound audio signal may be avoided. Mixer 226 outputs audio signal 274 to encoder 228.

Encoder 228 receives as input audio signal 274 from mixer 226. Encoder 228 may encode audio signal 274 for transmission as an outbound audio signal 276 over network 250. Outbound audio signal 276 may then be transmitted to video conference end points 150 via network 250.

Figure 3:
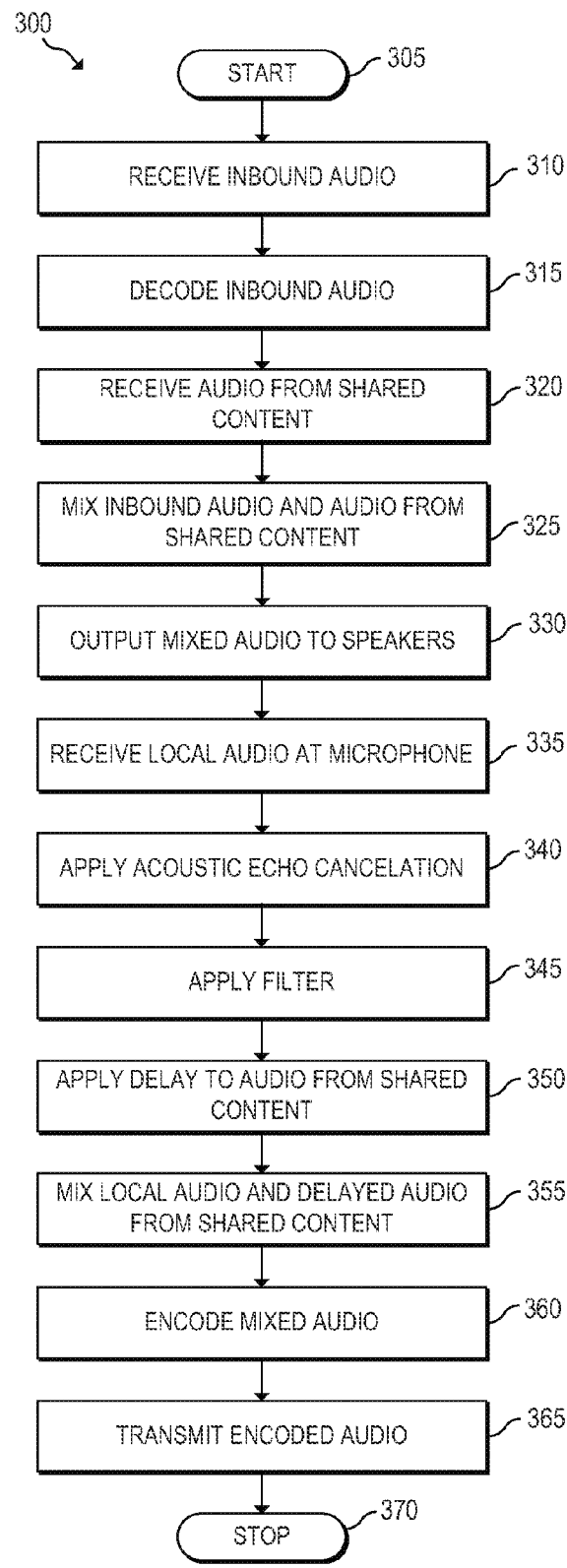
FIG. 3 is a flowchart of an example method for execution by a client computing device for processing audio of shared content.

FIG. 3 is a flowchart of an example method 300 for execution by client computing device 100 for processing audio of shared content. Although execution of method 300 is described below with reference to client computing device 100 of FIG. 1, other suitable devices for execution of method 300 will be apparent to those of skill in the art. Method 300 may be implemented in the form of executable instructions stored on a machine-readable storage medium, such as storage medium 120, and/or in the form of electronic circuitry.

Method 300 may start in block 305 and proceed to block 310, where an inbound audio signal is received at client computing device 100. The inbound audio signal may correspond to audio produced at video conference end points. The inbound audio signal may correspond to speech of the video conference participants or any other types of sound produced at the end point of the video conference.

Next, in block 315, client computing device 100 decodes the inbound audio signal.

In block 320, an audio signal is received from shared content. The audio signal from the shared content may be provided from content to be shared over a video conference. For example, the audio signal from the shared content may correspond to audio from a video dip to be shared with other participants in a video conference. The shared content may be from any type of audio producing means to be shared by video conference.

Next, in block 325, the inbound audio signal and the audio signal from the shared content are mixed together to produce a mixed audio signal. Next, method 300 may continue to block 330 where the mixed audio signal is output to a speaker for local playback.

In block 335, a local audio signal is received at a microphone. The local audio signal may correspond to sound (e.g., speech) that is generated in a room where a user is sharing the content in the video conference.

Next, in block 340, acoustic echo cancellation may be applied to the local audio signal and the mixed audio signal that is the mixed version of the decoded inbound audio signal and the audio signal from the shared content. The mixed audio signal may be canceled from the local audio signal to produce an echo canceled audio signal. The echo canceled signal is similar to the local audio signal but with any echoes removed. The echoes may result from the audio signal of the shared content and from the inbound audio signal.

Next, in block 345, a filter may be applied to the echo canceled audio signal to remove noise and any other undesired features therefrom and to further enhance the audio signal to produce a filtered audio signal.

In block 350, a delay may be applied to the audio signal from the shared content to produce a delayed audio signal. Delaying the audio signal form the shared content may be necessary since the acoustic echo cancellation may not block all echoes from the audio signal of the shared content. The audio signal from the shared content may be delayed by an amount that corresponds to the delay caused by the acoustic echo of the audio signal of the shared content. The amount of the delay may reflect the combined processing delays at the acoustic echo canceller 220, the filter 224 and any other processing modules that may be present in audio processor 220. Accordingly, any residual echo from the audio signal of the shared content in the filtered audio signal may be masked by the delay.

In block 355, the filtered audio signal is mixed with the delayed audio signal of the shared content to produce a mixed audio signal for output. By mixing the filtered audio signal with the delayed audio signal of the shared content before an encoding stage, quality degradation in an outbound audio signal may be avoided.

Next, in block 360, the mixed audio signal is encoded to produce an outbound signal to be transmitted to video conference end points via a network. Finally, in block 365, the encoded audio signal is transmitted over a network to the video conference endpoints. Method 300 may subsequently proceed to block 370, where method 300 may stop.

The foregoing disclosure describes a number of example embodiments for processing audio of shared content. In this manner, the embodiments disclosed herein process audio of shared content without causing acoustic feedback or degraded sound quality.

I claim:

1. A method of a computing device, comprising:
receiving a first audio signal, wherein the first audio signal corresponds to content to be shared in a video conference, and the first audio signal played for consumption by a plurality of participants of the video conference;
receiving a second audio signal from a microphone;
receiving a third audio signal from a network;
providing the first audio signal to a first input of a mixer in the computing device, and providing a version of the second audio signal to a second input of the mixer;
mixing, by the mixer, the first audio signal and the version of the second audio signal together to produce a fourth audio signal that includes the first audio signal added to the version of the second audio signal, wherein the fourth audio signal is prepared for output to the network;
mixing the first audio signal and the third audio signal together to produce a fifth audio signal, wherein the fifth audio signal is prepared for output to a speaker;
canceling acoustic echo of the fifth audio signal from the second audio signal to produce a sixth audio signal; and
filtering the sixth audio signal to produce the version of the second audio signal.

2. The method of claim 1, further comprising delaying the first audio signal to produce a delayed version of the first audio signal, wherein the first audio signal mixed with the version of the second audio signal to produce the fourth audio signal is the delayed version of the first audio signal.

3. The method of claim 1, further comprising encoding the fourth audio signal for output to the network.

4. The method of claim 1, further comprising outputting the fifth audio signal to a speaker.

5. The method of claim 1, further comprising decoding the third audio signal after the third audio signal is received from the network to produce a decoded version of the third audio signal, wherein the third audio signal mixed with the first audio signal to produce the fifth audio signal is the decoded version of the third audio signal.

6. A non-transitory machine-readable storage medium storing instructions that upon execution cause a computing device to:
receive a first audio signal corresponding to audible content to be shared for consumption by a plurality of participants in a video conference;
receive a second audio signal from a microphone;
receive a third audio signal from a video conference end point over a network;
provide the first audio signal to a first input of a first mixer in the computing device, and provide a version of the second audio signal to a second input of the first mixer;
receive a fourth audio signal produced by mixing, by the first mixer, the first audio signal and the version of the second audio signal together, the fourth audio signal including the first audio signal added to the version of the second audio signal, wherein the fourth audio signal is for output to the video conference end point;
receive a fifth audio signal produced by mixing, by a second mixer, the first audio signal and the third audio signal;
cancel acoustic echo of the fifth audio signal output by the second mixer from the second audio signal to produce a sixth audio signal;
filter the sixth audio signal to produce the version of the second audio signal; and
output the fifth audio signal to a speaker.

7. The non-transitory machine-readable storage medium of claim 6, wherein the instructions upon execution cause the computing device to further:
delay the first audio signal to produce a delayed version of the first audio signal, wherein first audio signal mixed, by the first mixer, with the delayed version of the second audio signal to produce the fourth audio signal is the delayed version of the first audio signal.

8. An audio processor comprising:
a first mixer to mix together a first audio signal and a second audio signal to produce a third audio signal, wherein the first audio signal corresponds to audible content to be played for consumption by a plurality of participants in a video conference, and wherein the second audio signal is received from a video conference end point coupled to a network, the third audio signal for output to a speaker;
a second mixer to mix together the first audio signal and a fourth audio signal to produce a fifth audio signal, the fifth audio signal comprising the first audio signal added to the fourth audio signal, the second mixer comprising a first input to receive the first audio signal, and a second input to receive the fourth audio signal, wherein the fourth audio signal is based on a signal received from a microphone, and wherein the fifth audio signal is for output to the network;
an acoustic echo canceler to cancel acoustic echo of the third audio signal from the signal received from the microphone to produce a sixth audio signal; and
a filter to filter the sixth audio signal to produce the fourth audio signal.

9. The audio processor of claim 8, further comprising:
a delay to delay the first audio signal, wherein the delayed first audio signal is mixed by the second mixer with the fourth audio signal to produce the fifth audio signal.

10. The audio processor of claim 8, further comprising:
an encoder to encode the fifth audio signal for output to the network.

11. The audio processor of claim 8, further comprising:
a decoder to decode the second audio signal after the second audio signal is received from the network.

12. The method of claim 1, wherein the first audio signal comprises a video clip to be shared in the video conference.

13. The method of claim 1, wherein the mixing of the first audio signal and the third audio signal to produce the fifth audio signal is performed by another mixer.

* * * * *